US 12,203,603 B2

(12) United States Patent
Hasegawa et al.

(10) Patent No.: US 12,203,603 B2
(45) Date of Patent: Jan. 21, 2025

(54) HYDROGEN GAS SUPPLY SYSTEM, POINT MANAGEMENT SYSTEM, AND SERVICE MANAGEMENT SYSTEM

(71) Applicant: TOYOTA JIDOSHA KABUSHIKI KAISHA, Toyota (JP)

(72) Inventors: Takahiko Hasegawa, Toyota (JP); Shunji Inoue, Okazaki (JP); Kenji Tsubosaka, Nagakute (JP); Kimihiko Teshima, Miyoshi (JP); Takanori Kito, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 577 days.

(21) Appl. No.: 17/652,208

(22) Filed: Feb. 23, 2022

(65) Prior Publication Data

US 2022/0228714 A1    Jul. 21, 2022

Related U.S. Application Data

(62) Division of application No. 16/659,675, filed on Oct. 22, 2019, now Pat. No. 11,293,592.

(30) Foreign Application Priority Data

Nov. 15, 2018    (JP) .................................. 2018-214545

(51) Int. Cl.
*F17C 5/06*    (2006.01)
*B67D 7/14*    (2010.01)
(Continued)

(52) U.S. Cl.
CPC ................ *F17C 5/06* (2013.01); *B67D 7/145* (2013.01); *B67D 7/24* (2013.01); *B67D 7/30* (2013.01);
(Continued)

(58) Field of Classification Search
USPC .......................................................... 702/30
See application file for complete search history.

(56) References Cited

U.S. PATENT DOCUMENTS

| 4,386,309 A | 5/1983 | Peschka |
| 2003/0083848 A1* | 5/2003 | Kami ...................... F17C 5/007 |
| | | 702/187 |

(Continued)

FOREIGN PATENT DOCUMENTS

| CN | 101276455 A | 10/2008 |
| JP | 2006146431 A | 6/2006 |

(Continued)

OTHER PUBLICATIONS

Burmistrz et al., "Carbon footprint of the hydrogen production process utilizing subbituminous coal and lignite gasification," Journal of Cleaner Production, published Aug. 24, 2016.

(Continued)

*Primary Examiner* — Paul D Lee
(74) *Attorney, Agent, or Firm* — Dickinson Wright, PLLC

(57) ABSTRACT

A hydrogen gas supply system comprises a storing unit that stores hydrogen, a communication unit that receives at least either of burden information indicative of an environmental burden exerted during manufacturing of hydrogen externally received by the storing unit and quality information indicative of quality with respect to the hydrogen externally received by the storing unit, a user interface unit that provides an output in accordance with the at least either of the burden information and the quality information with respect to the hydrogen supplied from the storing unit to the user, and a controller that controls the user interface unit based on an amount of the hydrogen received by the storing (Continued)

unit and the at least either of the burden information and the quality information, which is received by the communication unit.

10 Claims, 5 Drawing Sheets

(51) Int. Cl.
| | |
|---|---|
| *B67D 7/24* | (2010.01) |
| *B67D 7/30* | (2010.01) |
| *B67D 7/32* | (2010.01) |
| *B67D 7/78* | (2010.01) |
| *G06Q 30/0226* | (2023.01) |
| *G06Q 50/06* | (2012.01) |
| *H01M 8/04082* | (2016.01) |
| *B67D 7/04* | (2010.01) |
| *G06Q 30/018* | (2023.01) |

(52) U.S. Cl.
CPC ............ *B67D 7/3281* (2013.01); *B67D 7/78* (2013.01); *G06Q 30/0226* (2013.01); *G06Q 50/06* (2013.01); *H01M 8/04201* (2013.01); *B67D 2007/0442* (2013.01); *B67D 2007/0453* (2013.01); *B67D 2007/329* (2013.01); *G06Q 30/018* (2013.01); *H01M 2250/20* (2013.01)

(56) References Cited

U.S. PATENT DOCUMENTS

| | | | |
|---|---|---|---|
| 2004/0205032 A1* | 10/2004 | Routtenberg | B60L 58/30 |
| | | | 429/430 |
| 2008/0236247 A1 | 10/2008 | Nojima et al. | |
| 2009/0187416 A1 | 7/2009 | Baer et al. | |
| 2010/0161455 A1 | 6/2010 | Robinson | |
| 2010/0307636 A1 | 12/2010 | Uemura | |
| 2012/0067457 A1 | 3/2012 | Reeder et al. | |
| 2015/0134437 A1* | 5/2015 | Watanabe | G06Q 30/0225 |
| | | | 705/14.26 |
| 2017/0282793 A1 | 10/2017 | Ishida et al. | |
| 2020/0273047 A1 | 8/2020 | Bridge et al. | |

FOREIGN PATENT DOCUMENTS

| | | |
|---|---|---|
| JP | 2008243110 A | 10/2008 |
| JP | 2013130918 A | 7/2013 |
| JP | 2016223589 A | 12/2016 |
| JP | 2017178078 A | 10/2017 |

OTHER PUBLICATIONS

Takahiko Hasegawa et al., U.S. Appl. No. 16/659,675, filed Oct. 22, 2019.

Takahiko Hasegawa et al., U.S. Appl. No. 16/659,675, Restriction Requirement dated Feb. 22, 2021.

Takahiko Hasegawa et al., U.S. Appl. No. 16/659,675, Non-Final Office Action dated Apr. 13, 2021.

Takahiko Hasegawa et al., U.S. Appl. No. 16/659,675, Final Rejection dated Aug. 6, 2021.

Takahiko Hasegawa et al., U.S. Appl. No. 16/659,675, Advisory Action dated Nov. 2, 2021.

Takahiko Hasegawa et al., U.S. Appl. No. 16/659,675, Notice of Allowance dated Nov. 26, 2021.

* cited by examiner

HYDROGEN GAS SUPPLY SYSTEM, POINT MANAGEMENT SYSTEM, AND SERVICE MANAGEMENT SYSTEM

RELATED APPLICATION

This application is a division of U.S. patent application Ser. No. 16/659,675, filed Oct. 22, 2019, which claims priority to Japanese Patent Application No. 2018-214545, filed on Nov. 15, 2018, including the specification, drawings and abstract, the entire disclosure of which is incorporated herein by reference.

CROSS REFERENCE TO RELATED APPLICATIONS

The present application claims the priority based on Japanese Patent Application No. 2018-214545 filed on Nov. 15, 2018, the disclosure of which is hereby incorporated by reference in its entirety.

BACKGROUND

Field

The present disclosure relates to a hydrogen gas supply system, a point management system, and a service management system.

Related Art

Hydrogen stations that supply hydrogen gas to users have been available. For example, in the technology in JP 2016-223589A, an operator attaches a filling nozzle to a fuel tank mounted on a vehicle, and then enters a filling start instruction on an input portion. Due to differential pressure between an accumulator and the fuel tank, the fuel tank is then filled, via a hydrogen gas supply pipe, a filling hose, and the filling nozzle, with high-pressure hydrogen gas stored in the accumulator in a hydrogen station. When an output of a gas flowmeter provided to the hydrogen gas supply pipe is equal to or below a predetermined value, filling of hydrogen gas to the fuel tank ends.

A hydrogen station stores hydrogen gas manufactured through various methods. Various methods as described below, for example, are available for manufacturing hydrogen. (1) A first method obtains hydrogen by allowing fossil fuel and water vapor to react with each other. (2) A second method obtains hydrogen by allowing hydrocarbon obtained from biomass and water vapor to react with each other. (3) A third method obtains hydrogen as a by-product in iron mills and chemical factories. (4) A fourth method obtains hydrogen by allowing water to undergo electrolysis with electric power obtained by utilizing solar light and wind power.

With the first method, a large amount of hydrogen can be stably manufactured. Furthermore, with the first method, hydrogen can be cost-effectively manufactured. Carbon dioxide and nitrogen oxide are however generated in the process of manufacturing hydrogen. With the second method and the third method, an amount of obtained hydrogen may vary depending on biomass or an amount of how much a main product is generated in an iron mill or a chemical factory. Furthermore, with the second method and the third method, carbon dioxide is generated. With the fourth method, no carbon dioxide is generated. With the fourth method, however, an amount of hydrogen varies depending on natural phenomena such as weather conditions, preventing hydrogen from being stably supplied. Furthermore, with the fourth method, currently, a cost of producing hydrogen is higher, compared with the first to third methods.

In the technology described in JP 2016-223589A, a user of a vehicle is not notified with information on a method for manufacturing hydrogen gas stored in a hydrogen station. This prevents, from selecting and purchasing hydrogen, the user to be supplied with hydrogen, who is willing to purchase such hydrogen that is higher in cost but lower in an environmental burden. For example, a user is not able to make a selection of a hydrogen station providing hydrogen manufactured with less environmental burdens or a hydrogen station providing hydrogen manufactured with more environmental burdens. In a case where a hydrogen station is supplied with hydrogen from a plurality of supply sources where methods for manufacturing hydrogen differ from each other, and stores such hydrogen gas, a user is not able to make at all a selection of one of the methods for manufacturing hydrogen.

SUMMARY

The present disclosure can be implemented in aspects described below.

According to an aspect of the present disclosure, a hydrogen gas supply system that supplies hydrogen gas to a user is provided. The hydrogen gas supply system comprises a storing unit that stores hydrogen, a communication unit that receives at least either of burden information indicative of an environmental burden exerted during manufacturing of hydrogen externally received by the storing unit and quality information indicative of quality with respect to the hydrogen externally received by the storing unit, a user interface unit that provides an output in accordance with the at least either of the burden information and the quality information with respect to the hydrogen supplied from the storing unit to the user, and a controller that controls the user interface unit based on an amount of the hydrogen received by the storing unit and the at least either of the burden information and the quality information, which is received by the communication unit.

DETAILED DESCRIPTION

A. Embodiment

A1. Configuration of Hydrogen Supply System

Figure 1:
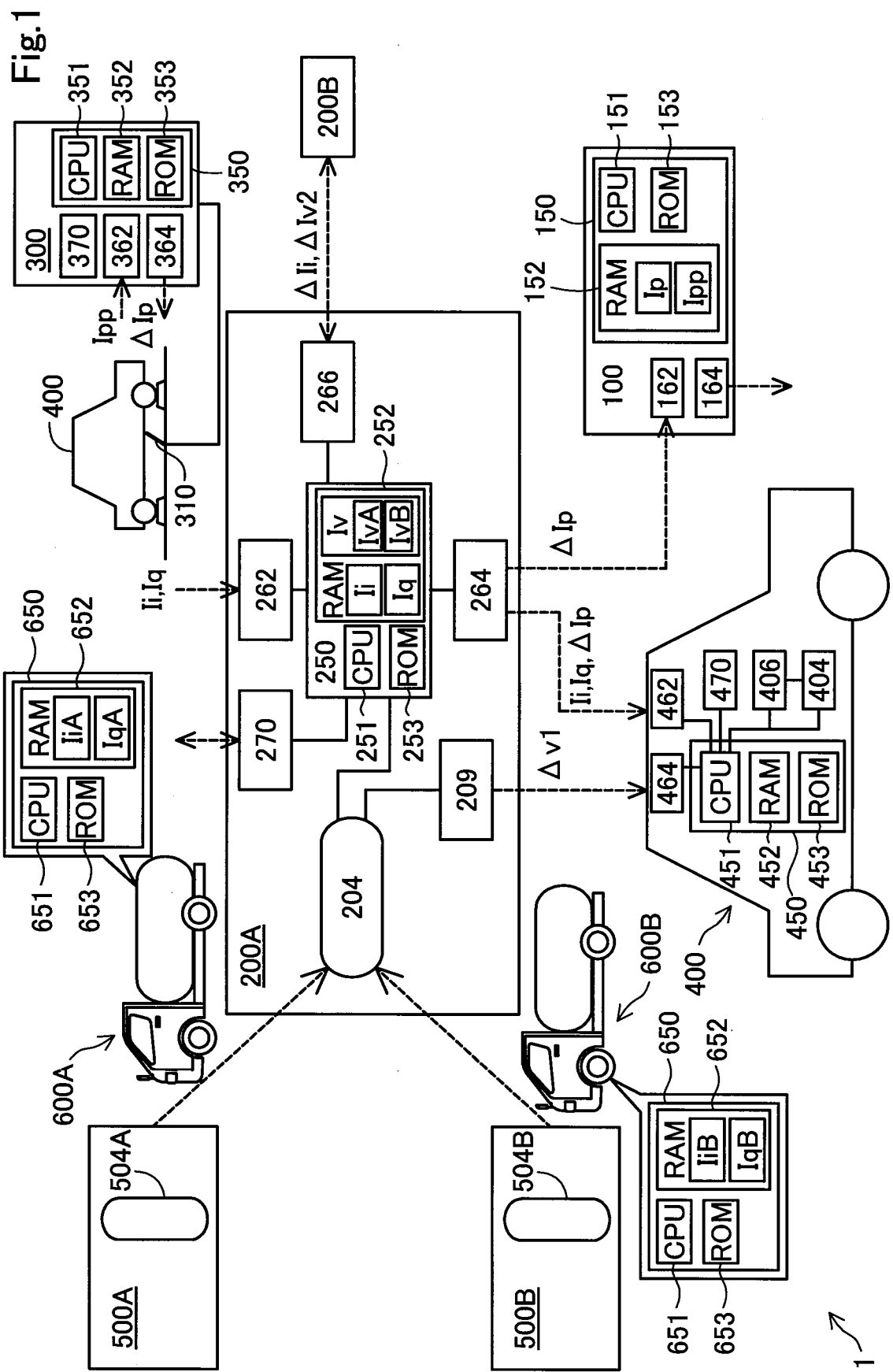
FIG. 1 is an explanatory diagram of a hydrogen management system 1 according to a present embodiment.

FIG. 1 is an explanatory diagram of a hydrogen management system 1 according to the present embodiment. The hydrogen management system 1 includes a point management server 100, hydrogen gas supply facilities 200A and 200B, a service management device 300, hydrogen generation facilities 500A and 500B, and hydrogen gas delivery vehicles 600A and 600B.

The hydrogen gas supply facility 200A is a store that supplies hydrogen gas to users. The hydrogen gas supply facility 200A is, in the present embodiment, a so-called hydrogen station that supplies hydrogen gas to a hydrogen vehicle 400. The hydrogen gas supply facility 200A includes a hydrogen gas storing unit 204, a hydrogen gas supply device 209, a control device 250, communication interfaces 262, 264, and 266, and a display panel 270.

The hydrogen gas storing unit 204 is a tank that stores hydrogen gas. The hydrogen gas storing unit 204 can store hydrogen gas at a maximum amount of 300 liters under a pressure of approximately 82 MPa.

The hydrogen gas supply device 209 can supply hydrogen gas in the hydrogen gas storing unit 204 to outside of the hydrogen gas supply facility 200. A target to which the hydrogen gas supply device 209 supplies hydrogen gas is, specifically, the hydrogen vehicle 400.

The control device 250 controls components of the hydrogen gas supply facility 200A. The control device 250 includes a central processing unit (CPU) 251 serving as a processor, a random access memory (RAM) 252, and a read-only memory (ROM) 253. The control device 250 is installed with a control program that controls the components of the hydrogen gas supply facility 200A. In the control device 250, the CPU 251, the RAM 252, and the ROM 253 serving as hardware resources and the control program cooperate with each other. Specifically, the CPU 251 loads the computer program stored in the ROM 253 into the RAM 252 and executes the computer program to achieve various functions. The RAM 252 stores information obtained or generated by the CPU 251.

The CPU 251 controls the display panel 270 based on, for example, an amount of hydrogen received by the hydrogen gas storing unit 204 and burden information Ii and quality information Iq received by the communication interface 262. The burden information Ii and the quality information Iq will be described later. The CPU 251 exchanges various kinds of information with a device outside of the hydrogen gas supply facility 200A, and stores in the RAM 252 the obtained information or information generated from the obtained information. FIG. 1 illustrates, as 262, 264, and 266, the communication interfaces each allowing the control device 250 to exchange various kinds of information with a device outside of the hydrogen gas supply facility 200A. Information to be exchanged via the communication interfaces will be described later.

The display panel 270 includes a display provided with a touch panel, as well as includes a speaker. The display panel 270 outputs information stored by the control device 250 to a user of the hydrogen gas supply facility 200A. The display panel 270 further delivers information input externally to the control device 250.

For example, the display panel 270 is controlled by the control device 250 to output the burden information Ii and the quality information Iq with respect to hydrogen to be supplied from the hydrogen gas storing unit 204 to the user. By performing such processing as described above, the user can utilize information generated based on information on an environmental burden exerted during manufacturing and quality, which is output from the display panel 270, to determine whether to accept supply of hydrogen stored in the hydrogen gas storing unit 204.

The hydrogen generation facility 500A allows fossil fuel and water to react with each other to generate hydrogen. More specifically, the hydrogen generation facility 500A allows methane and water vapor to react with each other to generate hydrogen and carbon monoxide. The hydrogen generation facility 500A further allows the carbon monoxide and water vapor to react with each other to generate hydrogen and carbon dioxide. The generated hydrogen is compressed and liquefied. The hydrogen generation facility 500A includes a liquid hydrogen storing unit 504A. The liquid hydrogen storing unit 504A is a tank that stores hydrogen generated and liquefied by the hydrogen generation facility 500A.

The hydrogen gas delivery vehicle 600A receives liquid hydrogen from the liquid hydrogen storing unit 504A of the hydrogen generation facility 500A and delivers the liquid hydrogen to the hydrogen gas supply facility 200. The hydrogen gas delivery vehicle 600A includes a controller 650.

The controller 650 includes a CPU 651 serving as a processor, a RAM 652, and a ROM 653. The CPU 651 controls components of the hydrogen gas delivery vehicle 600A. The CPU 651 exchanges various kinds of information with a device outside of the hydrogen gas delivery vehicle 600A, and stores in the RAM 652 the obtained information or information generated from the obtained information.

The hydrogen generation facility 500B generates hydrogen by allowing water to undergo electrolysis with electric power obtained by utilizing natural energy. The hydrogen generation facility 500B includes a single crystal silicon solar battery. With the single crystal silicon solar battery irradiated with solar light, the hydrogen generation facility 500B generates electric power. The hydrogen generation facility 500B generates hydrogen by allowing water to undergo electrolysis with the generated electric power. The generated hydrogen is compressed and liquefied. The hydrogen generation facility 500B includes a liquid hydrogen storing unit 504B. The liquid hydrogen storing unit 504B is a tank that stores hydrogen generated and liquefied by the hydrogen generation facility 500B.

A cost of generating hydrogen in the hydrogen generation facility 500B is higher than a cost of generating hydrogen identically in amount in the hydrogen generation facility 500A. On the other hand, environmental burdens exerted when hydrogen is generated in the hydrogen generation facility 500B are smaller than environmental burdens exerted when hydrogen is generated identically in amount in the hydrogen generation facility 500A. Environmental burdens can be assessed based on an amount of carbon dioxide generated and an amount of electric power consumed when a unit amount of hydrogen is produced.

The hydrogen gas delivery vehicle 600B receives liquid hydrogen from the liquid hydrogen storing unit 504B of the hydrogen generation facility 500B and delivers the liquid hydrogen to the hydrogen gas supply facility 200. The hydrogen gas delivery vehicle 600B is identical in configuration and function to the hydrogen gas delivery vehicle 600A.

The hydrogen gas supply facility 200B is a store that supplies hydrogen to users. The hydrogen gas supply facility 200B is identical in configuration and function to the hydrogen gas supply facility 200A. However, a distance from the hydrogen gas supply facility 200B to a nearest hydrogen generation facility that utilizes natural energy to generate hydrogen is three or more times of a distance from the hydrogen gas supply facility 200A to the hydrogen generation facility 500B that utilizes natural energy to generate hydrogen. In the present designation, the hydrogen gas supply facilities 200A and 200B will each be simply referred to as a hydrogen gas supply facility 200 unless otherwise required to be separately described.

The service management device 300 is a device that manages service contents to be provided to users. In the present embodiment, the service management device 300 is provided in a pay parking lot to manage services of the pay parking lot. More specifically, the service management device 300 controls a lock plate 310 provided at each of parking spaces in the pay parking lot to calculate a charge for use of the each of the parking spaces. The service management device 300 includes a controller 350, communication interfaces 362 and 364, and a display panel 370.

The controller 350 controls devices in the pay parking lot including the service management device 300. The controller 350 includes a CPU 351 serving as a processor, a RAM 352, and a ROM 353. The controller 350 is installed with a control program that controls the devices in the pay parking lot including the service management device 300. In the controller 350, the CPU 351, the RAM 352, and the ROM 353 serving as hardware resources and the control program cooperate with each other. Specifically, the CPU 351 loads the computer program stored in the ROM 353 into the RAM 352 and executes the computer program to achieve various functions. The RAM 352 stores information obtained or generated by the CPU 351.

For example, the CPU 351 exchanges various kinds of information with a device outside of the service management device 300, and stores in the RAM 352 the obtained information or information generated from the obtained information. The communication interfaces each allowing the controller 350 to exchange various kinds of information with a device outside of the service management device 300 are respectively illustrated as 362 and 364.

The display panel 370 includes a display provided with a touch panel, as well as includes a speaker. The display panel 370 outputs information stored by the controller 350 to a user utilizing the services. The display panel 370 delivers information input externally to the controller 350.

The lock plate 310 is a plate provided at each of the parking spaces in the pay parking lot, and is configured to changing its posture with respect to a plane into which a vehicle is to be parked. The lock plate 310 is controlled by the service management device 300 to take either of a lock state and an unlock state. In the lock state, the lock plate 310 is tilted at a predetermined angle relative to the plane into which a vehicle is to be parked. In the unlock state, the lock plate 310 abuts, i.e., is substantially parallel to, the plane into which a vehicle is to be parked.

While the lock plate 310 is in the lock state, a vehicle parked in the parking space cannot move off the parking space. On the other hand, while the lock plate 310 is in the unlock state, a vehicle parked in the parking space can move off the parking space. While the lock plate 310 is in the unlock state, and no vehicle is parked in the parking space, a vehicle can be parked in the parking space. While the lock plate 310 is in the lock state, no vehicle can be parked in the parking space even when no other vehicle is parked in the parking space. FIG. 1 illustrates the lock plate 310 in the lock state.

The hydrogen vehicle 400 is a vehicle that uses hydrogen to run. The hydrogen vehicle 400 includes a hydrogen gas storing unit 404, a fuel cell device 406, a controller 450, communication interfaces 462 and 464, and a display panel 470.

The hydrogen gas storing unit 404 is a tank that stores hydrogen gas. The hydrogen gas storing unit 404 can store hydrogen gas at a maximum amount of approximately 130 liters under a pressure of approximately 70 MPa. The fuel cell device 406 is supplied with hydrogen gas from the hydrogen gas storing unit 404, uses hydrogen, and generates electric power. The hydrogen vehicle 400 runs by causing an electric motor (not illustrated) to use electric power generated by the fuel cell device 406.

The controller 450 controls devices of the hydrogen vehicle 400. The controller 450 includes a CPU 451 serving as a processor, a RAM 452, and a ROM 453. The CPU 451 exchanges various kinds of information with a device outside of the hydrogen vehicle 400, and stores in the RAM 452 the obtained information or information generated from the obtained information. The communication interfaces each allowing the controller 450 to exchange various kinds of information with a device outside of the hydrogen vehicle 400 are respectively illustrated as 462 and 464.

The display panel 470 includes a display provided with a touch panel, as well as includes a microphone and a speaker. The display panel 470 outputs information stored by the controller 450 to a user of the hydrogen vehicle 400. The display panel 470 delivers information input externally to the controller 450.

The point management server 100 manages points issued by the hydrogen gas supply facilities 200A and 200B. Specifically, the point management server 100 receives changed-point information ΔIp indicative of points issued by the hydrogen gas supply facilities 200A and 200B, links the changed-point information ΔIp to individual users, and stores and manages point information Ip indicative of the points. The point management server 100 includes a controller 150.

The controller 150 includes a CPU 151 serving as a processor, a RAM 152, and a ROM 153. The controller 150 is installed with a control program that processes the point information Ip. In the controller 150, the CPU 151, the RAM 152, and the ROM 153 serving as hardware resources and the control program cooperate with each other. Specifically, the CPU 151 loads the computer program stored in the ROM 153 into the RAM 152 and executes the computer program to achieve various functions. The RAM 152 stores information obtained or generated by the CPU 151. The communication interfaces each allowing the controller 150 to exchange various kinds of information with a device outside of the point management server 100 are respectively illustrated as 162 and 164.

A2. Exchanging Information in Hydrogen Management System (1) Receiving Hydrogen in Hydrogen Gas Supply Facility:

Hydrogen generated in the hydrogen generation facility 500A is delivered by the hydrogen gas delivery vehicle 600A to the hydrogen gas supply facility 200A, and accommodated in the hydrogen gas storing unit 204. The hydrogen gas delivery vehicle 600A stores, in the RAM 652, the burden information Ii indicative of an environmental burden exerted when hydrogen is generated and manufactured in the hydrogen generation facility 500A, and the quality information Iq indicative of quality with respect to the hydrogen generated in the hydrogen generation facility 500A.

The burden information Ii with respect to hydrogen generated in the hydrogen generation facility 500A is referred to as burden information IiA. The quality information Iq with respect to the hydrogen generated in the hydrogen generation facility 500A is referred to as quality information IqA. On the other hand, the burden information Ii with respect to hydrogen generated in the hydrogen generation facility 500B is referred to as burden information IiB. The quality information Iq with respect to the hydrogen generated in the hydrogen generation facility 500B is referred to as quality information IqB.

The burden information Ii is determined based on an amount of fossil fuel consumed for generating hydrogen at an amount of 1 mol or an amount of carbon dioxide generated for generating hydrogen at an amount of 1 mol. The quality information Iq includes information on whether the hydrogen satisfies (i) ISO14687 1999 Type I, Grade A, (ii) ISO14687-2 2008 Type I, Grade D, or (iii) ISO14687-2 2012 Type I, Grade D.

When hydrogen is received from the hydrogen gas delivery vehicle 600A to the hydrogen gas storing unit 204, the control device 250 receives the burden information IiA and the quality information IqA stored in the RAM 652 of the hydrogen gas delivery vehicle 600A. Specifically, the communication interface 262 receives the burden information Ii with respect to hydrogen received externally by the hydrogen gas storing unit 204 and the quality information Iq with respect to the hydrogen received externally by the hydrogen gas storing unit 204. Each time hydrogen is received from the hydrogen gas delivery vehicle 600A to the hydrogen gas storing unit 204, the control device 250 links an amount of the received hydrogen to the burden information IiA and the quality information IqA, and stores in the RAM 252 the linked information.

An amount of hydrogen received in the hydrogen gas storing unit 204 can be calculated based on, for example, pressure and temperature in the hydrogen gas storing unit 204 before and after the hydrogen is received from the hydrogen gas delivery vehicle 600A to the hydrogen gas storing unit 204. Here assumes that the hydrogen gas storing unit 204 can store gas at a constant volume. An amount of hydrogen provided to outside of the hydrogen gas storing unit 204 can be calculated with the identical method.

Hydrogen generated in the hydrogen generation facility 500B is delivered by the hydrogen gas delivery vehicle 600B to the hydrogen gas supply facility 200A, and accommodated in the hydrogen gas storing unit 204. The hydrogen gas delivery vehicle 600B stores, in the RAM 652, the burden information IiB indicative of an environmental burden exerted when hydrogen is generated and manufactured in the hydrogen generation facility 500B, and the quality information IqB indicative of quality with respect to the hydrogen generated in the hydrogen generation facility 500B.

The burden information IiB with respect to hydrogen generated in the hydrogen generation facility 500B through photovoltaic power generation is indicative of that an environmental burden is lesser, compared with the burden information IiA with respect to hydrogen generated in the hydrogen generation facility 500A by using fossil fuel. In the present embodiment, the quality information IqB of quality with respect to hydrogen generated in the hydrogen generation facility 500B is indicative of that the hydrogen is higher in quality, compared with the quality information IqA of quality with respect to hydrogen generated in the hydrogen generation facility 500A.

When hydrogen is received from the hydrogen gas delivery vehicle 600B to the hydrogen gas storing unit 204, the control device 250 receives the burden information IiB and the quality information IqB via the communication interface 262. Each time hydrogen is received from the hydrogen gas delivery vehicle 600B to the hydrogen gas storing unit 204, the control device 250 links an amount of the received hydrogen to the burden information IiB and the quality information IqB, and stores in the RAM 252 the linked information.

The control device 250 performs processing described below each time hydrogen is received from outside. The control device 250 calculates a current amount of hydrogen stored in the hydrogen gas storing unit 204. The control device 250 further calculates, in the current amount, a ratio of an amount of hydrogen linked to the burden information IiA and a ratio of an amount of hydrogen linked to the burden information IiB. The control device 250 then stores the calculated amount and ratios in the RAM 252 as a part of the burden information Ii. In other words, the RAM 252 stores, as a part of the burden information Ii, the burden information IiA and the burden information IiB with respect to hydrogen, which are respectively linked to information IvA and information IvB of amounts of hydrogen. As a result, the burden information Ii in the RAM 252 includes information separately indicative of hydrogen obtained by allowing fossil fuel and water to react with each other and hydrogen obtained by allowing water to undergo electrolysis with electric power obtained by utilizing natural energy. Based on the information, constituting portions G11 and G12 in the graph in FIG. 2, described later, are generated. Unless otherwise required to be separately described per different environmental burden, information on an amount of hydrogen is simply referred to as "information Iv of an amount of hydrogen".

By generating and storing the burden information Ii described above, the hydrogen gas supply facility 200A can satisfy a user willingly accepting supply of, instead of hydrogen obtained by allowing fossil fuel and water to react with each other, hydrogen obtained by allowing water to undergo electrolysis with electric power obtained by utilizing natural energy.

The control device 250 calculates a current amount of hydrogen stored in the hydrogen gas storing unit 204. The control device 250 further calculates, in the current amount, a ratio of an amount of hydrogen linked to the quality information IqA and a ratio of an amount of hydrogen linked to the quality information IqB. The control device 250 then stores in the RAM 252 the calculated amount and ratios as a part of the quality information Iq. In other words, the RAM 252 stores, as a part of the quality information Iq, the quality information IqA and the quality information IqB with respect to hydrogen, which are respectively linked to the information IvA and the information IvB of amounts of hydrogen. As a result, the quality information Iq includes information separately indicative of hydrogen per a level of quality.

In the example in FIG. 1, the hydrogen generation facilities from which hydrogen is supplied to the hydrogen gas supply facility 200A are the hydrogen generation facilities 500A and 500B. However, the hydrogen gas supply facility 200A can further be supplied with hydrogen from another hydrogen gas supply facility (not illustrated).

(2) Supplying Hydrogen from Hydrogen Gas Supply Facility to Hydrogen Vehicle:

The hydrogen gas supply facility 200A supplies hydrogen gas to the hydrogen vehicle 400. The control device 250 of the hydrogen gas supply facility 200A causes the display panel 270 of the hydrogen gas supply facility 200A to provide predetermined display to urge a user of the hydrogen vehicle 400 to select hydrogen gas.

Figure 2:
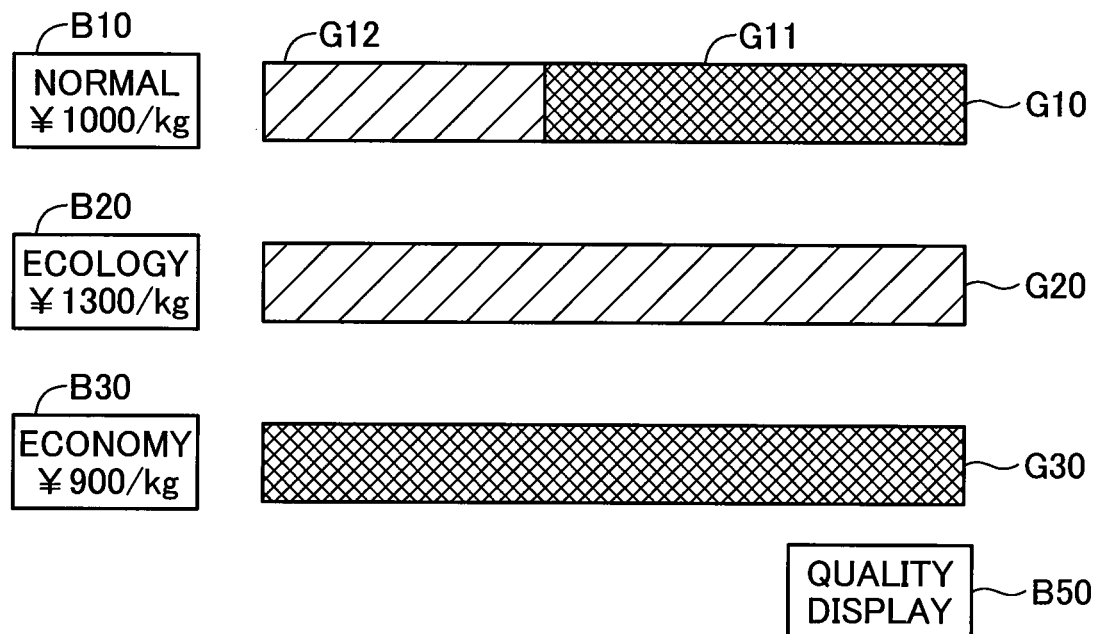
FIG. 2 is a diagram of display on a display panel 270 of a hydrogen gas supply facility 200A.

FIG. 2 is a diagram of display on the display panel 270 of the hydrogen gas supply facility 200A. The display panel 270 provides the display in FIG. 2 when the user of the hydrogen vehicle 400 enters, via the display panel 270, his or her identification information to pay a charge. The display panel 270 provides, buttons B10, B20, and B30 indicative of options, bar graphs G10, G20, and G30 indicative of environmental burdens with respect to the options, and a button B50 used to switch a screen to "Quality Display".

The buttons B10, B20, and B30 are buttons used to select hydrogen for the hydrogen vehicle 400. Before hydrogen is supplied from the hydrogen gas storing unit 204 to the user, the control device 250 of the hydrogen gas supply facility 200A receives, from the user, via one of the buttons B10, B20, and B30 displayed on the display panel 270, designation of an environmental burden with respect to hydrogen to be supplied to the user.

The button B10 provides a "Normal" option to the user. The "Normal" option is an option with which hydrogen stored in the hydrogen gas storing unit 204 of the hydrogen gas supply facility 200A is supplied as is to the hydrogen vehicle 400. The button B20 provides an "Ecology" option to the user. The "Ecology" option is an option with which, in the hydrogen stored in the hydrogen gas storing unit 204 of the hydrogen gas supply facility 200A, hydrogen generated with a smaller environmental burden in the hydrogen generation facility 500B is selectively supplied to the hydrogen vehicle 400. The button B30 provides an "Economy" option to the user. The "Economy" option is an option with which, in the hydrogen stored in the hydrogen gas storing unit 204 of the hydrogen gas supply facility 200A, hydrogen generated in the hydrogen generation facility 500A, which is manufactured at a lower cost and thus is cheaper, is selectively supplied to the hydrogen vehicle 400.

The graph G10 is a graph indicative of breakdowns of environmental burdens with respect to hydrogen to be provided to a user when the "Normal" option is selected. The breakdowns of the environmental burdens with respect to hydrogen to be provided to a user when the "Normal" option is selected equal to breakdowns of environmental burdens with respect to hydrogen stored in the hydrogen gas storing unit 204. The graph G10 includes the portion G11 and the portion G12.

The portion G11 is colored in orange. The portion G11 is indicative of, in hydrogen stored in the hydrogen gas storing unit 204, a ratio of hydrogen obtained by allowing fossil fuel and water to react with each other. In the present embodiment, the portion G11 is indicative of a ratio of hydrogen generated in the hydrogen generation facility 500A.

The portion G12 is colored in blue. The portion G12 is indicative of, in the hydrogen stored in the hydrogen gas storing unit 204, a ratio of hydrogen obtained by allowing water to undergo electrolysis with electric power obtained by utilizing natural energy. In the present embodiment, the portion G12 is indicative of a ratio of hydrogen generated in the hydrogen generation facility 500B.

The graph G20 is a graph indicative of breakdowns of environmental burdens with respect to hydrogen to be provided to a user when the "Ecology" option is selected. The graph G20 is colored in blue. Hydrogen to be provided to a user when the "Ecology" option is selected is hydrogen wholly obtained by allowing water to undergo electrolysis with electric power obtained by utilizing natural energy. In the present embodiment, hydrogen to be provided to a user when the "Ecology" option is selected is hydrogen generated in the hydrogen generation facility 500B.

The graph G30 is a graph indicative of breakdowns of environmental burdens with respect to hydrogen to be provided to a user when the "Economy" option is selected. The graph G30 is colored in orange. Hydrogen to be provided to a user when the "Economy" option is selected is hydrogen wholly obtained by allowing fossil fuel and water to react with each other. In the present embodiment, hydrogen to be provided to a user when the "Economy" option is selected is hydrogen generated in the hydrogen generation facility 500A.

The buttons B10, B20, and B30 each display a price of hydrogen per 1 kg for the hydrogen vehicle 400. Hydrogen generated in the hydrogen generation facility 500B is higher in manufacturing cost than hydrogen generated in the hydrogen generation facility 500A. Accordingly, the "Ecology" option is higher in unit price than the "Normal" option. The "Economy" option is lower in unit price than the "Normal" option.

A user of the hydrogen vehicle 400, who thinks that hydrogen to be consumed by himself or herself should be manufactured through a method offering a smaller environmental burden, as well as thinks that a cost for that purpose should be paid by himself or herself, willingly selects B20, i.e., "Ecology". A user of the hydrogen vehicle 400, who thinks that a cost of hydrogen to be consumed by himself or herself is suppressed as lower as possible, willingly selects B30, i.e., "Economy". Other users select B10, i.e., "Normal".

By performing such processing as described above, a user can designate, before accepting supply of hydrogen, for example, as hydrogen to be supplied, hydrogen that has exerted a smaller environmental burden during manufacturing to urge an administrator of the hydrogen gas supply facility 200A to utilize hydrogen that has exerted a smaller environmental burden.

Even when the "Ecology" or "Economy" option is selected, in actual cases, not only hydrogen manufactured in a certain hydrogen generation facility, but also hydrogen manufactured in other hydrogen generation facilities, in hydrogen stored in the hydrogen gas storing unit 204, will be supplied to the hydrogen vehicle 400. That is, hydrogen stored in the hydrogen gas storing unit 204 of the hydrogen gas supply facility 200A will be supplied to the hydrogen vehicle 400 without any selections.

However, a ratio of an amount of hydrogen linked to the burden information IiA and a ratio of an amount of hydrogen linked to the burden information IiB in an amount of hydrogen stored in the hydrogen gas storing unit 204 are recalculated in accordance with a selected option. That is, the control device 250 updates respective pieces of information on environmental burdens different from each other in the burden information Ii, which are respectively linked to pieces of information on amounts of hydrogen and stored in the RAM 252, based on a designated environmental burden and an amount $\Delta v1$ of hydrogen supplied from the hydrogen gas storing unit 204 to a user.

When the "Ecology" option is selected, it is assumed that hydrogen supplied at an amount to the hydrogen vehicle 400, in hydrogen linked to the burden information IiA in hydrogen stored in the hydrogen gas storing unit 204, has been used. Then a ratio of an amount of hydrogen linked to the burden information IiA and a ratio of an amount of hydrogen linked to the burden information IiB are recalculated. When the "Economy" option is selected, it is assumed that hydrogen supplied at an amount to the hydrogen vehicle 400, in hydrogen linked to the burden information IiB in hydrogen stored in the hydrogen gas storing unit 204, has been used. Then a ratio of an amount of hydrogen linked to the burden information IiA and a ratio of an amount of hydrogen linked to the burden information IiB are recalculated. When the "Normal" option is selected, a whole amount of hydrogen stored in the hydrogen gas storing unit 204 reduces. However, a ratio of an amount of hydrogen linked to the burden information IiA and a ratio of an amount of hydrogen linked to the burden information IiB do not change.

The button B50 is a button used to display, instead of the options based on the burden information Ii indicative of environmental burdens, as illustrated in FIG. 2, options based on the quality information Iq indicative of quality.

In accordance with an option selected on the screen in FIG. 2 and the amount Δv1 of hydrogen supplied to the hydrogen vehicle 400, the control device 250 of the hydrogen gas supply facility 200A issues to the user a point exchangeable with a product or at least a part of a service. No point will be issued to a user who has selected an option on a screen in FIG. 3, described later.

The control device 250 issues one point per an amount of hydrogen of 1 kg to a user selecting, on the screen in FIG. 2, as the environmental burden with respect to hydrogen to be supplied, the "Ecology" option designating a smaller environmental burden than an environmental burden with respect to "Economy" or "Normal" to receive supply of the hydrogen. The control device 250 issues 0.5 points per an amount of hydrogen of 1 kg to a user selecting, as the environmental burden with respect to hydrogen to be supplied, the "Normal" option designating a smaller environmental burden than the environmental burden with respect to "Economy" to receive supply of the hydrogen.

Specifically, the issued points are sent, as the changed-point information ΔIp, via the communication interface 264 of the hydrogen gas supply facility 200A and the communication interface 462 of the hydrogen vehicle 400, to the controller 450.

The control device 250 issues no points to a user selecting, on the screen in FIG. 2, as the environmental burden with respect to hydrogen to be supplied, the "Economy" option designating a greater environmental burden than the environmental burden with respect to "Ecology" or "Normal" to receive supply of the hydrogen.

A user can beneficially designate, as an environmental burden with respect to hydrogen to be supplied, a smaller environmental burden. This urges a user to utilize hydrogen that has exerted a smaller environmental burden.

Figure 3:
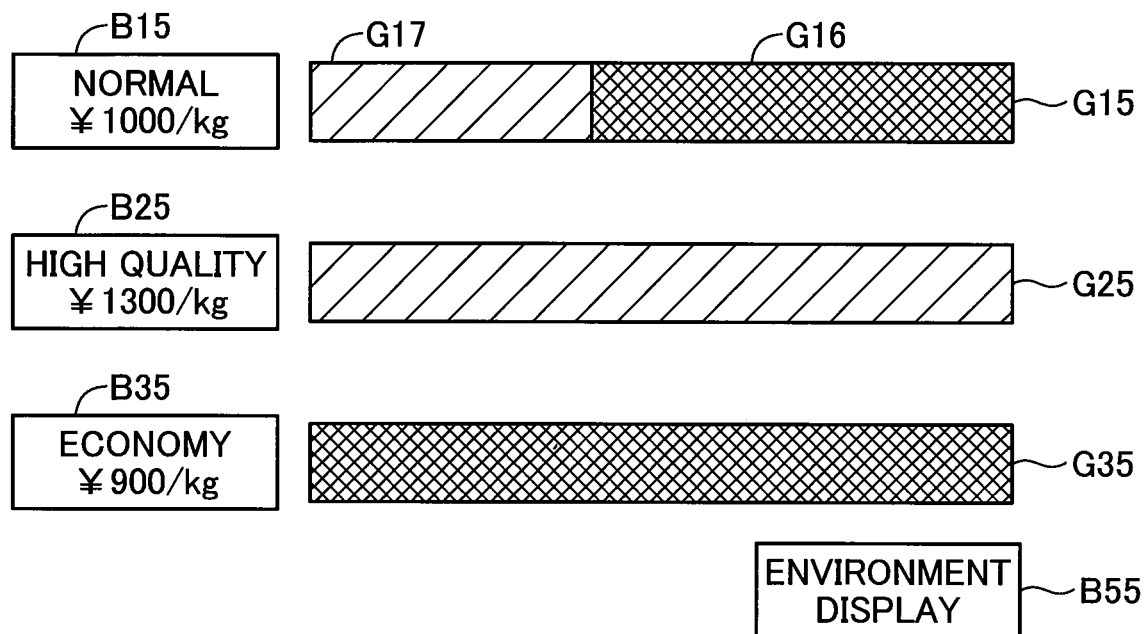
FIG. 3 is a diagram of display on the display panel 270 of the hydrogen gas supply facility 200A.

FIG. 3 is a diagram of display on the display panel 270 of the hydrogen gas supply facility 200A. When the button B50 is pressed in the state in FIG. 2, the control device 250 causes, based on the quality information Iq indicative of quality, the display panel 270 to provide options illustrated in FIG. 3. In that case, buttons B15, B25, and B35 respectively indicative of "Normal", "High Quality", and "Economy" options are provided.

The "Normal" option is an option with which hydrogen stored in the hydrogen gas storing unit 204 of the hydrogen gas supply facility 200A is supplied as is to the hydrogen vehicle 400. The "High Quality" option is an option with which, in the hydrogen stored in the hydrogen gas storing unit 204, hydrogen generated in either of the hydrogen generation facilities 500A and 500B, whichever is higher in quality, is selectively supplied to the hydrogen vehicle 400. In the present embodiment, hydrogen to be provided to a user when the "High Quality" option is selected is hydrogen generated in the hydrogen generation facility 500B. The "Economy" option is an option with which, in the hydrogen stored in the hydrogen gas storing unit 204, hydrogen generated in either of the hydrogen generation facilities 500A and 500B, whichever is lower in manufacturing cost, is selectively supplied to the hydrogen vehicle 400. In the present embodiment, hydrogen to be provided to a user when the "Economy" option is selected is hydrogen generated in the hydrogen generation facility 500A.

Next to the buttons B15, B25, and B35 indicative of the options, similar to the case in FIG. 2, bar graphs G15, G25, and G35 respectively indicative of breakdowns of hydrogen to be supplied under the options are provided.

The graph G15 is a graph indicative of breakdowns of environmental burdens with respect to hydrogen to be provided to a user when the "Normal" option is selected. A portion G16 in the graph G15 is colored in orange. The portion G16 is indicative of, in hydrogen stored in the hydrogen gas storing unit 204, a ratio of hydrogen obtained by allowing fossil fuel and water to react with each other. A portion G17 in the graph G15 is colored in blue. The portion G17 is indicative of, in the hydrogen stored in the hydrogen gas storing unit 204, a ratio of hydrogen obtained by allowing water to undergo electrolysis with electric power obtained by utilizing natural energy.

The graph G25 is a graph indicative of breakdowns of environmental burdens with respect to hydrogen to be provided to a user when the "High Quality" option is selected. The graph G25 is colored in blue. In the present embodiment, hydrogen to be provided to a user when the "High Quality" option is selected is hydrogen generated in the hydrogen generation facility 500B.

The graph G35 is a graph indicative of breakdowns of environmental burdens with respect to hydrogen to be provided to a user when the "Economy" option is selected. The graph G35 is colored in orange. In the present embodiment, hydrogen to be provided to a user when the "Economy" option is selected is hydrogen generated in the hydrogen generation facility 500A.

The display in FIG. 3 provides, as a button used to switch the screen to the state in FIG. 2, an "Environment Display" button B55, instead of the "Quality Display" button B50.

When hydrogen is to be received from the hydrogen gas supply facility 200A to the hydrogen gas storing unit 404, the controller 450 of the hydrogen vehicle 400 receives, from the control device 250, the burden information Ii, the quality information Iq, and the changed-point information ΔIp with respect to the hydrogen to be received (see FIG. 1). Specifically, the controller 450 receives the burden information Ii, the quality information Iq, and the changed-point information ΔIp via the communication interface 264 of the hydrogen gas supply facility 200A and the communication interface 462 of the hydrogen vehicle 400.

Each time hydrogen is received from the hydrogen gas supply facility 200A or the hydrogen gas supply facility 200B to the hydrogen gas storing unit 404, the controller 450 links the amount Δv1 of the hydrogen to the burden information Ii and the quality information Iq, and stores in the RAM 452 the linked information.

Each time hydrogen is received from the hydrogen gas supply facility 200A or the hydrogen gas supply facility 200B to the hydrogen gas storing unit 204, the controller 450 sums points indicated by the changed-point information ΔIp and stores in the RAM 452 the resultant information. The controller 450 separately sums a number of points added in past 30 days and stores in the RAM 452 the resultant information.

Figure 4:
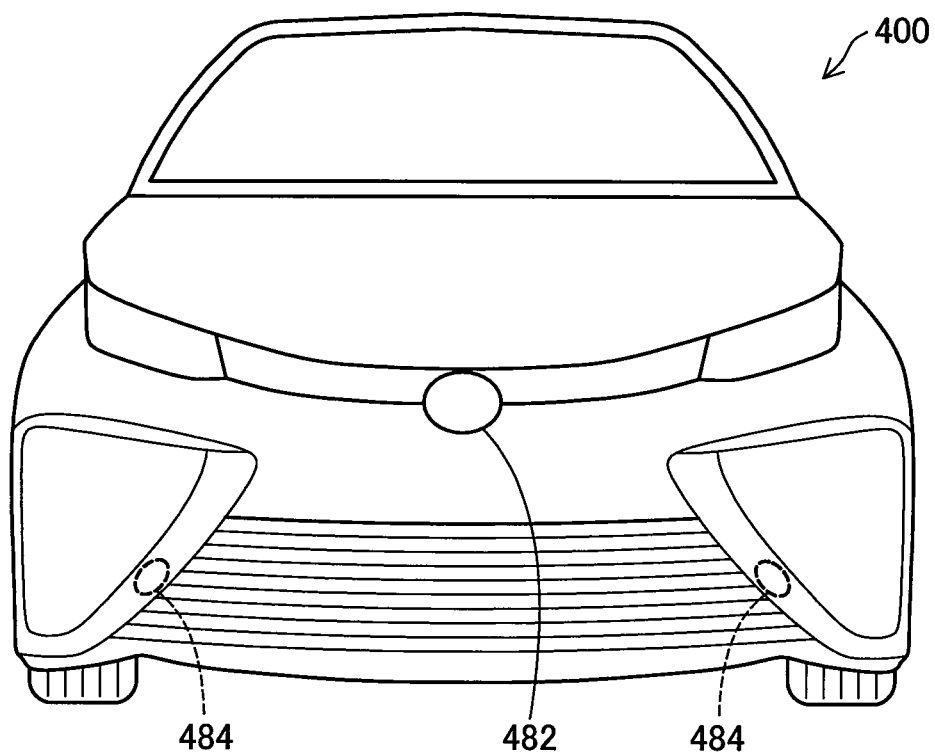
FIG. 4 is a front view of a hydrogen vehicle 400.

FIG. 4 is a front view of the hydrogen vehicle 400. The hydrogen vehicle 400 is provided with an emblem 482 representing the vehicle or a manufacturer of the vehicle at a center on a front. The emblem can emit light in various colors. The hydrogen vehicle 400 is provided with a pair of light-emitting portions 484 respectively on left and right sides of a lower portion with respect to the emblem 482 inside of a front bumper. The light-emitting portions 484 can also emit light in various colors.

When a number of points added in past 30 days does not exceed a threshold, the controller 450 causes the emblem 482 and the light-emitting portions 484 to emit light in orange. When a number of points added in past 30 days exceeds the threshold, the controller 450 causes the emblem 482 and the light-emitting portions 484 to emit light in blue. By performing such processing as described above, a user who is willing to bear a cost for reducing environmental burdens can differentiate himself or herself from users who are not willing to do so.

The CPU 151 of the controller 150 of the point management server 100 links identification information on a user to manage points issued to the user. In association with an individual identified by identification information, i.e., a user to which points are issued, the CPU 151 stores in the RAM 152 the point information Ip indicative of the points issued to the user. Points issued to a user are obtained by summing points indicated by the changed-point information ΔIp.

When the control devices 250 of the hydrogen gas supply facilities 200A and 200B have issued points to a user, the control device 250 of the hydrogen gas supply facility 200A sends, to the point management server 100, the changed-point information ΔIp sent to the hydrogen vehicle 400, together with identification information identifying the user of the hydrogen vehicle 400 (see FIG. 1). Specifically, the controller 150 of the point management server 100 receives the changed-point information ΔIp and the identification information via the communication interface 264 of the hydrogen gas supply facility 200A and the communication interface 162 of the point management server 100.

The CPU 151 of the point management server 100 receives the changed-point information ΔIp indicative of the points issued to the user, from the hydrogen gas supply facilities 200A and 200B via the communication interface 162. Based on the changed-point information ΔIp indicative of the issued points, the CPU 151 adds the issued points to points indicated by the point information Ip linked to the user and stored in the RAM 152.

By performing such processing as described above, a user can obtain benefits in accordance with an amount of supplied hydrogen that has exerted a smaller environmental burden. This urges a user to utilize hydrogen that has exerted a smaller environmental burden.

Upon a request from a user to the point management server 100, the CPU 151 outputs the point information Ip linked to the user and stored in the RAM 152 via the communication interface 164. Specifically, a user provides a request via the controller 450 and the communication interface 464 of the hydrogen vehicle 400 and the communication interface 162 of the point management server 100. The point information Ip output from the point management server 100 is received by the controller 450 via the communication interface 164 of the point management server 100 and the communication interface 462 of the hydrogen vehicle 400, and is displayed on the display panel 470 of the hydrogen vehicle 400.

The CPU 151 of the point management server 100 calculates points issued to a user per month. Information Ipp of points issued to the user in a last-past month is linked to the user and stored in the RAM 152. In accordance with a request from an external device such as the service management device 300, the CPU 151 outputs, via the communication interface 164, the information Ipp of points issued to the user in the previous month, which is linked to the user and stored in the RAM 152.

By performing such processing as described above, a service or a product can be provided to a user in accordance with points issued in a previous month to the user as a predetermined period.

Figure 5:
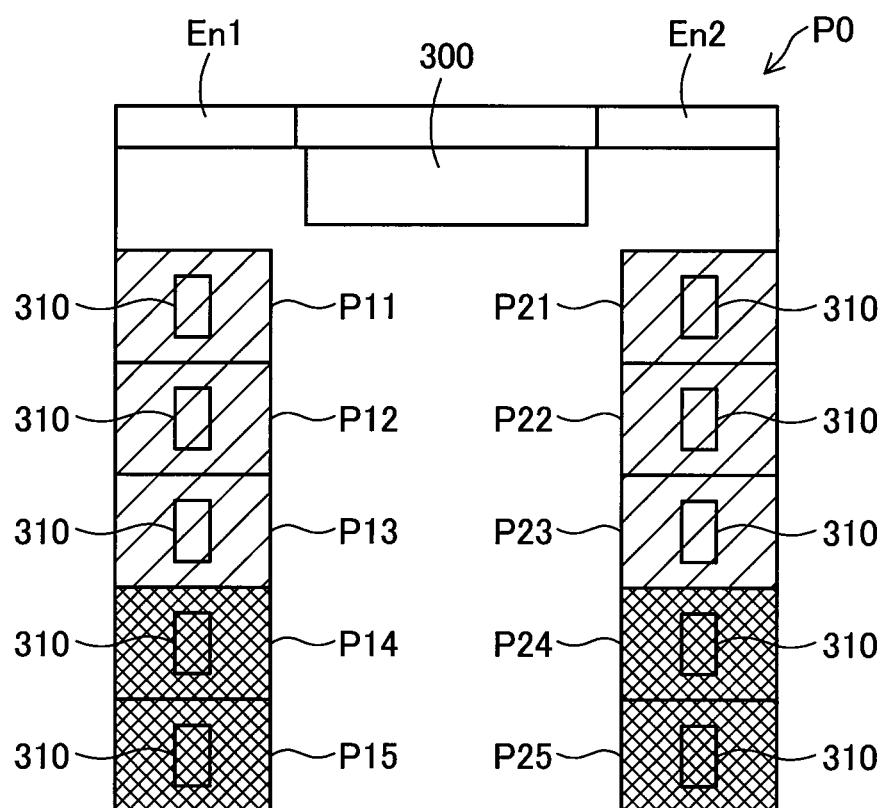
FIG. 5 is a plan view of a pay parking lot P0 provided adjacent to a facility.

(3) Utilizing Points:

FIG. 5 is a plan view of a pay parking lot P0 provided adjacent to a facility. The pay parking lot P0 is provided with entrances En1 and En2 to the facility, the service management device 300, and a plurality of parking spaces P11 to P15 and P21 to P25. The parking spaces P11 to P15 and P21 to P25 are each provided with the lock plate 310 (see FIG. 1).

When the hydrogen vehicle 400 enters the pay parking lot P0, processing described below is performed. That is, the controller 450 obtains beforehand identification information on the driver, and stores the identification information in the RAM 452, when a driver begins driving. When the hydrogen vehicle 400 enters the pay parking lot P0, the controller 450 sends the identification information to the service management device 300. Specifically, the controller 350 of the service management device 300 receives the identification information on the driver via the communication interface 462 of the hydrogen vehicle 400 and the communication interface 362 of the service management device 300.

The CPU 351 of the controller 350 of the service management device 300 sends, via the communication interface 364, the identification information on the driver to the point management server 100 to ask for the information Ipp of points issued in a previous month to the user. The CPU 351 of the service management device 300 receives, via the communication interface 362, from the point management server 100, the information Ipp of the points issued in the previous month to the user.

The CPU 351 of the service management device 300 does not permit a user having a smaller number of points issued in the previous month than a threshold to park a vehicle in one of some of parking spaces adjacent to the entrances En1 and En2 to the facility, i.e., in one of the parking spaces P11 to P13 and P21 to P23. On the other hand, the CPU 351 permits a user having a greater number of points issued in the previous month than the threshold to park a vehicle in one of the parking spaces P11 to P13 and P21 to P23.

Specifically, the CPU 351 causes the lock plates 310 in all parking spaces where no vehicles are parked, among the parking spaces P11 to P15 and P21 to P25, to each be in the unlock state, for a user having a greater number of points issued in the previous month than the threshold. The hydrogen vehicle 400 driven by such a user can be parked in a desired parking space where the lock plate 310 is in the unlock state.

On the other hand, when a number of points issued in the previous month is smaller than the threshold, the CPU 351 of the service management device 300 causes, to each be in the unlock state, the lock plates 310 in the parking spaces where no vehicles are parked, among the four parking spaces P14, P15, P24, and P25 that are farther from the entrances En1 and En2 to the facility than the parking spaces P11 to P13 and P21 to P23. The CPU 351 then causes the lock plates 310 in the parking spaces P11 to P13 and P21 to P23 to each be in the lock state. The hydrogen vehicle 400 can be parked in one of the parking spaces where the lock plates 310 are each be in the unlock state among the four parking spaces P14, P15, P24, and P25. The parking spaces P14, P15, P24, and P25 are crosshatched in FIG. 5.

By constantly accepting supply of hydrogen that has exerted a smaller environmental burden, a user can beneficially park a vehicle in a parking space adjacent to the entrances En1 and En2. This urges a user to utilize hydrogen that has exerted a smaller environmental burden.

After a certain period has passed from when the hydrogen vehicle 400 is parked in the parking space, the lock plate 310 in the parking space in which the hydrogen vehicle 400 is parked turns into the lock state.

When the hydrogen vehicle 400 is about to move off the pay parking lot P0, processing described below is performed. That is, the CPU 351 of the service management device 300 calculates points to be subtracted from points possessed by the user in accordance with a period of provision of the parking space to the user.

The CPU 351 of the service management device 300 causes, via the communication interface 364 of the service management device 300 and the communication interface 462 of the hydrogen vehicle 400, the display panel 470 of the hydrogen vehicle 400 to display the points to be subtracted from the points possessed by the user. The display panel 370 of the service management device 300 also displays similar information.

When the user of the hydrogen vehicle 400 makes an entry indicative of agreement of paying the displayed points via the display panel 470 or the display panel 370, the CPU 351 of the service management device 300 links the changed-point information ΔIp indicative of the points to be subtracted to the identification information on the user, and sends the linked information, via the communication interface 364, to the point management server 100.

The CPU 151 of the point management server 100 receives, via the communication interface 162, from the service management device 300, the changed-point information ΔIp indicative of the used points and linked to the identification information on the user. The CPU 151 subtracts the used points from the points indicated by the point information Ip that is linked to the user corresponding to the identification information and that is stored in the RAM 152.

Meanwhile, when the user of the hydrogen vehicle 400 makes the entry indicative of agreement of paying the displayed points via the display panel 470, the CPU 351 of the service management device 300 causes the lock plate 310 in the parking space in which the hydrogen vehicle 400 is parked to be in the unlock state. As a result, the hydrogen vehicle 400 can move off the parking space.

With the aspect described above, a user can obtain a service or a product in accordance with an amount of supplied hydrogen that has exerted a smaller environmental burden. This urges a user to utilize hydrogen that has exerted a smaller environmental burden.

(4) Exchanging Burden Information with Hydrogen Gas Supply Facility:

In hydrogen stored in the hydrogen gas storing unit 204 of the hydrogen gas supply facility 200A, a ratio of hydrogen generated in the hydrogen generation facility 500A and a ratio of hydrogen generated in the hydrogen generation facility 500B are primitively determined in accordance with an amount of hydrogen generated in the hydrogen generation facility 500A and supplied to the hydrogen gas storing unit 204 and an amount of hydrogen generated in the hydrogen generation facility 500B and supplied to the hydrogen gas storing unit 204. However, in the hydrogen stored in the hydrogen gas storing unit 204, the ratio of the hydrogen generated in the hydrogen generation facility 500A and the ratio of the hydrogen generated in the hydrogen generation facility 500B can vary through exchange of burden information among the hydrogen gas supply facilities.

The distance from the hydrogen gas supply facility 200B to the nearest hydrogen generation facility that utilizes natural energy to generate hydrogen is three or more times of the distance from the hydrogen gas supply facility 200A to the hydrogen generation facility 500B that utilizes natural energy to generate hydrogen. Delivering hydrogen from such a hydrogen generation facility that utilizes natural energy to generate hydrogen to the hydrogen gas supply facility 200B is inefficient. The hydrogen gas supply facility 200B therefore receives supply of hydrogen from other nearer hydrogen generation facilities than the hydrogen generation facility that utilizes natural energy to generate hydrogen.

The hydrogen gas supply facility 200B cannot primitively provide the "Ecology" option in supplying hydrogen (see FIG. 2). With processing described below in the present embodiment, however, the "Ecology" option can be provided in supplying hydrogen in the hydrogen gas supply facility 200B.

The control device 250 of the hydrogen gas supply facility 200A links information ΔIi including at least some of the burden information Ii that is linked to the information Iv of an amount of hydrogen and that is stored in the RAM 252 of the hydrogen gas supply facility 200A to information ΔIv2 of a predetermined amount of hydrogen, and sends the linked information, via the communication interface 266 of the hydrogen gas supply facility 200A, to the hydrogen gas supply facility 200B (see FIG. 1). The control device 250 of the hydrogen gas supply facility 200B links the information ΔIi including the at least some of the burden information Ii with respect to the hydrogen gas supply facility 200A, which is sent from the hydrogen gas supply facility 200A, to the information ΔIv2 of the amount of some of hydrogen stored in the hydrogen gas storing unit 204, and receives the linked information, via the communication interface 266 of the hydrogen gas supply facility 200B, from the hydrogen gas supply facility 200A.

On the other hand, the control device 250 of the hydrogen gas supply facility 200B links the information ΔIi including at least some of the burden information Ii that is linked to the information Iv of an amount of hydrogen and that is stored in the RAM 252 of the hydrogen gas supply facility 200B to the information ΔIv2 indicative of an amount of hydrogen, which is identical to the amount indicated by the information ΔIv2 of the predetermined amount of the hydrogen and is sent from the hydrogen gas supply facility 200A, and sends the linked information to the hydrogen gas supply facility 200A (see FIG. 1). The control device 250 of the hydrogen gas supply facility 200A links the information ΔIi including the at least some of the burden information Ii with respect to the hydrogen gas supply facility 200B, which is sent from the hydrogen gas supply facility 200B, to the information ΔIv2 of the amount of the some of the hydrogen stored in the hydrogen gas storing unit 204 of the hydrogen gas supply facility 200B, and receives the linked information from the hydrogen gas supply facility 200B.

The control device 250 of the hydrogen gas supply facility 200A updates the burden information Ii that is linked to the information Iv of the amount of the hydrogen and that is stored in the RAM 252 of the hydrogen gas supply facility 200A, based on the information ΔIi including the at least some of the burden information and sent to the hydrogen gas supply facility 200B and the information ΔIv2 of the amount of the hydrogen.

Furthermore, the control device 250 of the hydrogen gas supply facility 200A updates the burden information Ii that is linked to the information Iv of the amount of the hydrogen and that is stored in the RAM 252 of the hydrogen gas supply facility 200A, based on the information ΔIi including the at least some of the burden information and received from the hydrogen gas supply facility 200B and the information ΔIv2 of the amount of the hydrogen. Before and after the updates, an amount of hydrogen stored in the hydrogen gas storing unit 204 of the hydrogen gas supply facility 200A does not change.

On the other hand, the control device 250 of the hydrogen gas supply facility 200B updates the burden information Ii that is linked to the information Iv of the amount of the hydrogen and that is stored in the RAM 252 of the hydrogen gas supply facility 200B, based on the information ΔIi including the at least some of the burden information and sent to the hydrogen gas supply facility 200A and the information ΔIv2 of the amount of the hydrogen.

Furthermore, the control device 250 of the hydrogen gas supply facility 200B updates the burden information Ii that is linked to the information Iv of the amount of the hydrogen and that is stored in the RAM 252 of the hydrogen gas supply facility 200B, based on the information ΔIi including the at least some of the burden information and received from the hydrogen gas supply facility 200A and the information ΔIv2 of the amount of the hydrogen. Before and after the updates, an amount of hydrogen stored in the hydrogen gas storing unit 204 of the hydrogen gas supply facility 200B does not change.

That is, under an assumption that hydrogen generated by utilizing natural energy is supplied from the hydrogen gas supply facility 200A to the hydrogen gas supply facility 200B, and, alternately, hydrogen at an identical amount is supplied from the hydrogen gas supply facility 200B to the hydrogen gas supply facility 200A, a ratio of an amount of hydrogen linked to the burden information IA and a ratio of an amount of hydrogen linked to the burden information IiB, in hydrogen stored in the hydrogen gas storing unit 204, are respectively recalculated in each of the hydrogen gas supply facilities 200A and 200B. The ratios are stored in the RAM 252 of the control device 250 in each of the hydrogen gas supply facilities 200A and 200B. At that time, no hydrogen gas is actually exchanged.

After that, when hydrogen gas is supplied to the hydrogen vehicle 400 in each of the hydrogen gas supply facilities 200A and 200B, the display in FIG. 2 is provided in accordance with the recalculated ratios. In the display on the display panel 270 of the hydrogen gas supply facility 200A, the display of the graph G10 in FIG. 2 and the display of the graph G15 in FIG. 3 match with each other. After the information is exchanged as described above, however, the display of the graph G10 in FIG. 2 changes. Accordingly, in the display on the display panel 270 of the hydrogen gas supply facility 200A, the display of the graph G10 in FIG. 2 and the display of the graph G15 in FIG. 3 do not match with each other.

By performing such processing as described above, separately from the burden information Ii with respect to hydrogen actually received by the hydrogen gas storing unit 204 of the hydrogen gas supply facility 200B, the burden information Ii with respect to hydrogen can be shared between the plurality of hydrogen gas supply facilities 200A and 200B. Without actually moving hydrogen, supply of hydrogen that has exerted a smaller environmental burden can be facilitated as a whole among the hydrogen gas supply facilities 200A and 200B.

In the present embodiment, the hydrogen gas supply facilities 200A and 200B are each also sometimes referred to as a "hydrogen gas supply system". The hydrogen gas storing unit 204 is also sometimes referred to as a "storing unit". The communication interfaces 262, 264, and 266 are each also sometimes referred to as a "communication unit". The display panel 270 is also sometimes referred to as a "user interface unit". The control device 250 is also sometimes referred to as a "controller". The RAM 252 is also sometimes referred to as a "memory". An environmental burden exerted when hydrogen is generated and manufactured in the hydrogen generation facility 500A that allows fossil fuel and water to react with each other to generate the hydrogen is also sometimes referred to as a "first environmental burden". An environmental burden exerted when hydrogen is generated and manufactured in the hydrogen generation facility 500B that allows water to undergo electrolysis with electric power obtained by utilizing natural energy to generate the hydrogen is also sometimes referred to as a "second environmental burden".

In the present embodiment, the point management server 100 is also sometimes referred to as a "point management system". The RAM 152 is also sometimes referred to as a "point memory". The communication interfaces 162 and 164 are each also sometimes referred to as a "point communication unit". The CPU 151 is also sometimes referred to as a "point management unit".

In the present embodiment, the service management device 300 is also sometimes referred to as a "point management system". The CPU 351 is also sometimes referred to as a "service management unit". The communication interfaces 362 and 364 are each also sometimes referred to as a "service communication unit".

B. Other Embodiments

B1. Another Embodiment 1

(1) In the embodiment described above, the hydrogen gas supply facility 200A includes the hydrogen gas storing unit 204 that stores hydrogen gas. The hydrogen gas supply facility 200A serving as a hydrogen gas supply system may however include, instead of a storing unit that stores hydrogen gas, or in addition to a storing unit that stores hydrogen gas, a storing unit that stores hydrogen liquid. In such an aspect, it is preferable that a hydrogen gas supply system include a device that vaporizes hydrogen, and externally supply the vaporized hydrogen.

(2) In the embodiment described above, the communication interfaces of the point management server 100, the hydrogen gas supply facilities 200A and 200B, and the service management device 300 are illustrated by function in the block diagram in FIG. 1. The communication interfaces of the point management server 100, the hydrogen gas supply facilities 200A and 200B, and the service management device 300 may however be achieved by one or more of hardware having two or more functions.

(3) In the embodiment described above, the display panel 270 outputs the burden information Ii and the quality information Iq with respect to hydrogen to be supplied from the hydrogen gas storing unit 204 to a user (see FIGS. 1 and 2). The burden information Ii and the quality information Iq with respect to hydrogen supplied from the hydrogen gas storing unit 204 to a user may however be sent via the communication interfaces 264 and 462, and displayed on the display panel 470 of the hydrogen vehicle 400. That is, the display panel 470 of the hydrogen vehicle 400 may be allowed to function as a user interface unit.

(4) In the embodiment described above, the control device 250 of the hydrogen gas supply facility 200A accepts designation, from a user, of an environmental burden with respect to hydrogen to be supplied to the user, via one of the buttons B10, B20, and B30 displayed on the display panel 270 (see FIG. 2). An environmental burden and quality with respect to hydrogen to be supplied from the hydrogen gas storing unit 204 to a user may however be designated from the display panel 470 of the hydrogen vehicle 400 via either of the communication interfaces 464 and 262. That is, the display panel 470 of the hydrogen vehicle 400 may be allowed to function as a user interface unit.

(5) In the embodiment described above, identification information on a user is entered, via the touch panel of the display panel 270, into the control device 250 of the hydrogen gas supply facility 200A. Such an aspect can however be applied that the display panel 270 serving as a user interface unit includes a magnetic card reader, an integrated circuit (IC) card reader, or a two-dimensional barcode reader, for example. Via such a reader, identification information on a user is entered into the control device 250 of the hydrogen gas supply facility 200A.

(6) In the embodiment described above, the controller 450 of the hydrogen vehicle 400 is provided in the hydrogen vehicle 400. However, a portable device such as a smartphone held by a user may serve as a device that allows the controller 450 to execute the processing described above to allow information to be exchanged among the hydrogen gas supply facilities 200A and 200B, the service management device 300, and the point management server 100.

(7) In the embodiment described above, the hydrogen gas supply facility 200A can provide to users hydrogen generated by allowing water to undergo electrolysis with electric power obtained by utilizing natural energy (see FIGS. 1 and 2). However, the hydrogen gas supply facility 200A cannot sometimes be supplied with hydrogen obtained by utilizing natural energy. Furthermore, the hydrogen gas supply facility 200A cannot sometimes be supplied in a virtual manner with hydrogen obtained by utilizing natural energy by exchanging the information ΔIi including at least some of the burden information Ii. In such a case, the graph G10 displayed on the display panel 270 of the hydrogen gas supply facility 200A does not indicate the portion G12, but only indicates the portion G11. The button B20 and the graph G20 are each displayed in a lighter color, compared with a case where such hydrogen can be provided.

In such a case, a user can view the display on the display panel 270, and can make a selection to not accept supply of hydrogen from the hydrogen gas supply facility 200A, but to accept supply of hydrogen from another hydrogen gas supply facility.

(8) In the embodiment described above, the controller 450 of the hydrogen vehicle 400 causes, when a number of points added in past 30 days is exceeding the threshold, the emblem 482 and the light-emitting portions 484 to emit light in blue (see FIG. 4). A number of days, during which points are accumulated, for comparing with the threshold, may however be another number of days such as 10 days or 20 days. The controller 450 of the hydrogen vehicle 400 can change display outside of the hydrogen vehicle 400 in accordance with designation of an environmental burden with respect to hydrogen supplied immediately before.

(9) In the embodiment described above, the controller 450 of the hydrogen vehicle 400 changes, in accordance with a number of points added in past 30 days, a color of light emitted by the emblem 482 and the light-emitting portions 484 (see FIG. 4). A target to be changed in accordance with a number of obtained points is not however limited to a light-emitting portion. For example, a color of at least a part of a body of the hydrogen vehicle 400 may be changed. Otherwise a part of a shape of the hydrogen vehicle 400 may be changed.

(10) In the embodiment described above, the display panel 270 that provides information to an individual user of the hydrogen vehicle 400 to be supplied with hydrogen is controlled by the control device 250 to output the burden information Ii and the quality information Iq with respect to the hydrogen to be supplied from the hydrogen gas storing unit 204 to the user. Information on breakdowns of environmental burdens with respect to hydrogen stored in the hydrogen gas storing unit 204 (see G10 in FIG. 2) may however be displayed in a real time manner on a signboard of the hydrogen gas supply facility 200A for unspecified users, for example. By taking such an action, a user can view environmental burden information displayed on such a signboard to determine whether to use the hydrogen gas supply facility 200A.

B2. Another Embodiment 2

(1) In the embodiment described above, as methods for generating hydrogen, the method for using fossil fuel in the hydrogen generation facility 500A and the method for using natural energy in the hydrogen generation facility 500B are described. Methods for generating hydrogen to be received by hydrogen gas supply systems may however include other methods, in addition to the methods described above, for example, a method for obtaining hydrogen by allowing hydrocarbon obtained from biomass and water vapor to react with each other and a method for obtaining hydrogen as a by-product in iron mills and chemical factories.

For example, a hydrogen generation facility can be a facility that generates hydrogen by allowing water to undergo electrolysis with electric power generated from natural energy such as wind power, wave power, and geothermal heat. A hydrogen generation facility can be an iron mill provided with a coke oven serving as a hydrogen manufacturing apparatus. A hydrogen gas generation facility may be a facility that modifies petroleum to extract hydrogen. A hydrogen gas generation facility may be a chemical factory that generates hydrogen as a by-product.

Such an aspect may be applied that methods for generating hydrogen to be received by hydrogen gas supply systems do not include one or more of the four methods described above. Furthermore, a hydrogen gas supply system can receive supply of hydrogen that is generated with a plurality of separate methods and that is mixed beforehand. In the present designation, a "method for generating hydrogen" includes mixing of generated hydrogen.

The burden information Ii and the quality information Iq with respect to hydrogen generated in a hydrogen generation facility can therefore vary. Each time supply of hydrogen is received from outside, a hydrogen gas supply system links burden information and quality information received from a hydrogen gas delivery vehicle at that time to an amount of the hydrogen received from the hydrogen gas delivery vehicle, and manages the linked information.

(2) In the embodiment described above, the quality information Iq includes information on whether the hydrogen satisfies (i) ISO14687 1999 Type I, Grade A, (ii) ISO14687-2 2008 Type I, Grade D, or (iii) ISO14687-2 2012 Type I, Grade D. Such an aspect can however be applied that quality information includes information on quantitative quality with respect to hydrogen provided by each hydrogen generation facility.

B3. Another Embodiment 3

In the embodiment described above, the hydrogen gas supply facility 200A receives, from a user, before hydrogen is supplied from the hydrogen gas storing unit 204 to the user, designation of an environmental burden with respect to the hydrogen to be supplied to the user via one of the buttons B10, B20, and B30 displayed on the display panel 270. The environmental burden with respect to hydrogen to be supplied to a user may however be designated after the user is actually supplied with the hydrogen.

In the embodiment described above, designation of an environmental burden can be handled separately from an actual method for manufacturing hydrogen. Even when, in hydrogen stored in a storing unit, hydrogen manufactured through a method that has exerted a designated environmental burden is not actually enough, a request from a user can be satisfied by allowing burden information and information on an amount of the hydrogen to be exchanged among hydrogen gas supply systems.

B4. Another Embodiment 4

(1) In the embodiment described above, the control device 250 of the hydrogen gas supply facility 200A links the information $\Delta$Ii including at least some of the burden information Ii that is linked to the information Iv of an amount of hydrogen and that is stored in the RAM 252 to the information $\Delta$Iv2 of an amount of some of hydrogen stored in the hydrogen gas storing unit 204, and sends the linked information, via the communication interface 266 of the hydrogen gas supply facility 200A, to the hydrogen gas supply facility 200B (see FIG. 1). A hydrogen gas supply system may however send the information $\Delta$Ii indicative of an environmental burden exerted during manufacturing of hydrogen, together with information on an excess amount of hydrogen from an amount of hydrogen stored in a storing unit.

In the embodiment described above, designation of an environmental burden can be handled separately from an actual method for manufacturing hydrogen. Information on an amount of hydrogen that is not actually accommodated in a storing unit, can therefore be exchanged together with burden information among hydrogen gas supply systems.

(2) In the embodiment described above, the control device 250 of the hydrogen gas supply facility 200A updates the burden information Ii that is linked to information on an amount of hydrogen and that is stored in the RAM 252 of the hydrogen gas supply facility 200A, based on the information $\Delta$Ii including the at least some of burden information sent to the hydrogen gas supply facility 200B and the information $\Delta$Iv2 of the amount of hydrogen. Such an aspect can however be applied that a hydrogen gas supply system does not update the burden information Ii stored in the RAM 252, but stores and updates, separately from information on hydrogen in its storing unit, earning and expense due to exchange of burden information with another hydrogen gas supply system.

(3) In the embodiment described above, the control device 250 of the hydrogen gas supply facility 200A links the information $\Delta$Ii including the at least some of the burden information Ii that is linked to the information Iv of the amount of hydrogen and that is stored in the RAM 252 to the information $\Delta$Iv2 of the amount of some of hydrogen stored in the hydrogen gas storing unit 204, and sends the linked information, via the communication interface 266 of the hydrogen gas supply facility 200A, to the hydrogen gas supply facility 200B (see FIG. 1). Such an aspect can however be applied that a hydrogen gas supply system does not send such burden information.

B5. Another Embodiment 5

(1) In the embodiment described above, the control device 250 of the hydrogen gas supply facility 200B updates the burden information Ii with respect to the hydrogen gas supply facility 200B, which is stored in the RAM 252 of the hydrogen gas supply facility 200B, based on the information $\Delta$Ii including at least some of burden information received from the hydrogen gas supply facility 200A and the information $\Delta$Iv2 of an amount of hydrogen. Such an aspect can however be applied that a hydrogen gas supply system does not update the burden information Ii stored in the RAM 252, but stores and updates, separately from information on hydrogen in its storing unit, earning and expense due to exchange of burden information with another hydrogen gas supply system.

(2) In the embodiment described above, the control device 250 of the hydrogen gas supply facility 200B links the information $\Delta$Ii including the at least some of the burden information Ii with respect to the hydrogen gas supply facility 200A, which is sent from the hydrogen gas supply facility 200A, to the information $\Delta$Iv2 of the amount of some of hydrogen stored in the hydrogen gas storing unit 204, and receives the linked information, via the communication interface 266 of the hydrogen gas supply facility 200B, from the hydrogen gas supply facility 200A. Such an aspect can however be applied that a hydrogen gas supply system does not receive such burden information.

B6. Another Embodiment 6

In the embodiment described above, a number of points to be issued to a user selecting the "Ecology" option is one per an amount of hydrogen of 1 kg. A number of points to be issued to a user selecting the "Normal" option is 0.5 per an amount of hydrogen of 1 kg. The control device 250 issues no points to a user selecting the "Economy" option to accept supply of the hydrogen. A method for issuing points to a user may however be another method.

For example, points may be issued to a user designating hydrogen generated through a method that has exerted environmental burdens at a highest amount. Such an aspect can be applied that a number of points to be issued is not determined in accordance with an amount of hydrogen, but points determined beforehand are issued each time hydrogen is supplied. Specific values of points to be issued can be specified as desired, such as five points and ten points.

B7. Another Embodiment 7

In the embodiment described above, the point management server 100 manages points issued by the hydrogen gas supply facilities 200A and 200B. Such an aspect can however be applied that no such device that collectively manages points is provided, but information is shared in a cloud-computing manner and is updated by each hydrogen gas supply system.

B8. Another Embodiment 8

(1) In the embodiment described above, as a user utilizes a service, the CPU 151 of the point management server 100 subtracts points corresponding to the provided service from points indicated by the point information Ip that is linked to the user corresponding to identification information and that is stored in the RAM 152. Such an aspect can however be applied that a point management unit of a point management system sends to a service management system the point information Ip with respect to a user, and receives, from the service management system, subtracted points of the user to manage the points of the user.

(2) Charges upon utilization of services and upon receipt of products may be paid by means of, instead of points, another charge paying system, credit cards, and cash, for example.

B9. Another Embodiment 9

(1) In the embodiment described above, the CPU 151 of the point management server 100 links, to a user, the information Ipp of points issued to the user in a last-past month, and stores the linked information in the RAM 152. A target period for which points issued to a user are calculated and stored in a point memory may however be three months before a last-past month or six months before a last-past month, as well as may be another period such as 30 days before the previous day or 60 days before the previous day.

(2) In the embodiment described above, the CPU 151 of the point management server 100 links the point information Ip to identification information on the user, and manages points indicated by the point information Ip (see FIG. 1). Such an aspect can however be applied that a point management unit links point information to a vehicle supplied with hydrogen, and stores in a point memory and manages the linked point information, similar to the embodiments described above. In the hydrogen gas supply facility 200 and the service management device 300, identification information on a vehicle may be obtained through, for example, optical reading of a car registration plate of the vehicle, or obtained when a controller of the vehicle externally sends the identification information on the vehicle.

With such an aspect, an aspect of utilizing a pay parking lot in one of the embodiments described above can be controlled per vehicle. As well as, for example, when an insurance rate for the vehicle is determined or when the vehicle is sold, the insurance rate or a price of the vehicle can be determined by taking into account a number of points linked to the vehicle. Even points linked to a user can be taken into account when an insurance rate is determined or when a vehicle is sold.

(3) Such an aspect can be applied that a point management system does not calculate points issued during a predetermined period to a user. For example, such an aspect can be applied that points issued during a predetermined period to a user are calculated by the controller 450 of the hydrogen vehicle 400, and the calculated points are stored in the RAM 452 to allow components of a hydrogen management system to utilize the points.

B10. Another Embodiment 10

In the embodiment described above, when the hydrogen vehicle 400 moves off the pay parking lot P0, the CPU 351 of the service management device 300 calculates points to be subtracted from points possessed by a user in accordance with provision of a parking space to the user (see FIGS. 1 and 5). The CPU 351 links the changed-point information ΔIp of the points used, which indicates points to be subtracted, to identification information on the user, and sends the linked information, via the communication interface 364, to the point management server 100. Such an aspect can however be applied that a service management system does not perform such processing. For example, such processing may be performed by the controller 450 of the hydrogen vehicle 400.

B11. Another Embodiment 11

The CPU 351 of the service management device 300 does not permit a user having a smaller number of points issued in a previous month than a threshold to park a vehicle in one of some of parking spaces, i.e., the parking spaces P11 to P13 and P21 to P23 (see FIGS. 1 and 5). On the other hand, a user having a greater number of points issued in a previous month than the threshold is permitted to park a vehicle in one of the parking spaces P11 to P13 and P21 to P23.

Such an aspect can however be applied that a service management system does not make such separation, but provides services to a user without any exception regardless of a number of points issued during a predetermined period to the user. Such an aspect can be applied that, in accordance with a number of points issued during a predetermined period to a user, a number of points to be subtracted is changed, and services are provided. Such an aspect can be applied that, for a user having a greater number of points issued during a predetermined period than the threshold, a lesser number of points is subtracted, compared with a user having a smaller number of points issued during the predetermined period than the threshold.

In addition to provision of parking spaces, services to be provided to users may take various aspects such as additional provision of a product. Such an aspect can be applied that, in car-sharing, for example, the higher the number of points issued during a predetermined period to a user, the higher the priority in allocation of a vehicle.

The present disclosure is not limited to the embodiments described above, and can be implemented in various ways without departing from the scope of the present disclosure. For example, the technical features of any of the above embodiments corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof.

B12. Another Embodiment 12

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to an aspect of the present disclosure, a hydrogen gas supply system that supplies hydrogen gas to a user is provided. The hydrogen gas supply system comprises a storing unit that stores hydrogen, a communication unit that receives at least either of burden information indicative of an environmental burden exerted during manufacturing of hydrogen externally received by the storing unit and quality information indicative of quality with respect to the hydrogen externally received by the storing unit, a user interface unit that provides an output in accordance with the at least either of the burden information and the quality information with respect to the hydrogen supplied from the storing unit to the user, and a controller that controls the user interface unit based on an amount of the hydrogen received by the storing unit and the at least either of the burden information and the quality information, which is received by the communication unit.

With the aspect described above, a user can utilize information generated based on at least either of an environmental burden exerted during manufacturing of hydrogen stored in the storing unit and quality of the hydrogen, which is output from the user interface unit, to determine whether to accept supply of the hydrogen.

(2) In the hydrogen gas supply system according to the aspect described above, such an aspect is possible that the burden information includes information at least separately indicative of hydrogen obtained by allowing fossil fuel and water to react with each other, and hydrogen obtained by allowing water to undergo electrolysis with electric power obtained by utilizing natural energy.

With the aspect described above, such a user can be satisfied who willingly accepts supply of, instead of hydrogen obtained by allowing fossil fuel and water to react with each other, hydrogen obtained by allowing water to undergo electrolysis with electric power obtained by utilizing natural energy.

(3) In the hydrogen gas supply system according to the aspect described above, such an aspect is possible that the controller includes a memory configured to store the burden information of the hydrogen related to information on an amount of the hydrogen. The controller is configured to accept, from the user, via the user interface unit, before the hydrogen is supplied from the storing unit to the user, designation of the environmental burden with respect to the hydrogen to be supplied to the user, and update, based on the designated environmental burden and an amount of the hydrogen supplied from the storing unit to the user, the burden information linked to the information on the amount of the hydrogen and stored in the memory.

With the aspect described above, a user can designate, before accepting supply of hydrogen, for example, as hydrogen to be supplied, hydrogen that has exerted a smaller environmental burden during manufacturing to urge an administrator of a hydrogen gas supply system to utilize hydrogen that has exerted a smaller environmental burden.

(4) In the hydrogen gas supply system according to the aspect described above, such an aspect is possible that the controller is configured to send, to another hydrogen gas supply system via the communication unit, information including at least some of the burden information related to the information on the amount of the hydrogen in the memory, with information on an amount of hydrogen linked, and update the burden information related to the information on the amount of the hydrogen in the memory, based on the information including the at least some of the burden information sent to the other hydrogen gas supply system and the information on the amount of the hydrogen linked.

With the aspect described above, separately from burden information with respect to hydrogen actually received by the storing unit, burden information with respect to hydrogen can be sent to another hydrogen gas supply system. Without actually moving hydrogen, supply of hydrogen that has exerted a smaller environmental burden can be facilitated as a whole among a plurality of hydrogen gas supply systems.

(5) In the hydrogen gas supply system according to the aspect described above, such an aspect is possible that the controller is further configured to receive, from another hydrogen gas supply system via the communication unit, information including at least some of the burden information related to information on an amount of hydrogen, and update the burden information stored in the memory, based on the information including the at least some of the burden information and the information on the amount of the hydrogen received from the other hydrogen gas supply system.

With the aspect described above, separately from burden information with respect to hydrogen actually received by the storing unit, burden information with respect to hydrogen can be shared among the plurality of hydrogen gas supply systems. Without actually moving hydrogen, supply of hydrogen that has exerted a smaller environmental burden can be facilitated as a whole among a plurality of hydrogen gas supply systems.

(6) In the hydrogen gas supply system according to the aspect described above, such an aspect is possible that the controller further configured to disallow a point exchangeable with at least a part of a product or a service to be issued to a user who has designated a first environmental burden as the environmental burden of the hydrogen to be supplied to accept supply of the hydrogen, and allow the point to be issued, via the communication unit, to a user who has designated a second environmental burden lower than the first environmental burden as the environmental burden of the hydrogen to be supplied to accept supply of the hydrogen.

With the aspect described above, a user can beneficially designate, as an environmental burden with respect to hydrogen to be supplied, a smaller environmental burden. This urges a user to utilize hydrogen that has exerted a smaller environmental burden.

(7) According to another aspect of the present disclosure, a point management system that manages a point to be issued by the hydrogen gas supply system according to the aspect described above is provided. The point management system comprises a point memory that stores information on the point related to a user for which the point is issued, a point communication unit that receives, from the hydrogen gas supply system, the information on the point issued to the user, and a point management unit that adds, based on the information on the issued point, the issued point to points indicated by the point information related to the user in the point memory. The point management unit outputs the point information linked to the user and stored in the point memory, via the point communication unit, in accordance with an external request.

With the aspect described above, a user can beneficially designate hydrogen that has exerted a smaller environmental burden, and can be supplied with the hydrogen. This urges a user to utilize hydrogen that has exerted a smaller environmental burden.

(8) In the point management system according to the aspect described above, such an aspect is possible that the point management unit is further configured to externally receive point information on used points, which is related to a user, via the point communication unit, and subtract the used points from points indicated by the point information related to the user in the point memory.

With the aspect described above, a user can obtain benefits in accordance with an amount of supplied hydrogen that has exerted a smaller environmental burden. This urges a user to utilize hydrogen that has exerted a smaller environmental burden.

(9) In the point management system according to the aspect described above, such an aspect is possible that the point management unit further configured to calculate points issued to a user during a predetermined period, and store in the point memory the points related to the user, and output information on the points issued during the period to the user, which is stored in the point memory related to the user, in accordance with an external request, via the point communication unit.

With the aspect described above, a service or a product can be provided to a user in accordance with a point issued during a predetermined period to the user.

(10) According to still another aspect of the present disclosure, a service management system that manages provision of at least either of a service and a product is provided. The service management system comprises a service management unit that calculates, in accordance with provision of at least either of a service and a product to a user, a point to be subtracted from points related to the user, and a service communication unit that send information indicative of the used points to be subtracted related to the user to the point management system according to the aspect described above.

With the aspect described above, a user can obtain a service or a product in accordance with an amount of supplied hydrogen that has exerted a smaller environmental burden. This urges a user to utilize hydrogen that has exerted a smaller environmental burden.

(11) According to still another aspect of the present disclosure, a service management system that manages provision of at least either of a service and a product is provided. The service management system comprises a service communication unit configured to receive, from the point management system according to the aspect described above, information on points issued during the period to a user, and a service management unit that does not provide, to a user with a smaller number of points issued during the period to the user than a threshold, at least either of a service and a product determined beforehand, and provides, to a user with a greater number of points issued during the period to the user than the threshold, at least either of the service and the product.

With the aspect described above, a user can beneficially constantly receive supply of hydrogen that has exerted a smaller environmental burden. This further urges a user to utilize hydrogen that has exerted a smaller environmental burden.

The present disclosure can be implemented in various aspects other than those described above. For example, the present disclosure can be implemented in aspects of a method for supplying hydrogen gas, a method for managing points, and a method for managing services, as well as a method for controlling a hydrogen gas supply system, a point management system, or a service management system, a computer program achieving the control method, and a non-transitory storage medium recorded with the computer program.

What is claimed is:

1. A point management system that manages a point to be issued by a hydrogen gas supply system the hydrogen gas supply system comprises:
   a storing unit that stores hydrogen;
   a communication unit that receives at least either of burden information indicative of an environmental burden exerted during manufacturing of hydrogen externally received by the storing unit and quality information indicative of quality with respect to the hydrogen externally received by the storing unit;
   a user interface unit that provides an output in accordance with the at least either of the burden information and the quality information with respect to the hydrogen supplied from the storing unit to a use; and
   a controller that controls the user interface unit based on an amount of the hydrogen received by the storing unit and the at least either of the burden information and the quality information, the at least either of the burden information and the quality information being received by the communication unit,
   wherein the controller includes a memory configured to store the burden information of the hydrogen related to information on an amount of the hydrogen,
   wherein the controller is configured to accept, from the user, via the user interface unit, before the hydrogen is supplied from the storing unit to the user, designation of the environmental burden with respect to the hydrogen to be supplied to the user, and
   wherein the controller is configured to update, based on the designated environmental burden and an amount of the hydrogen supplied from the storing unit to the user, the burden information linked to the information on the amount of the hydrogen and stored in the memory,
   wherein the controller is further configured to disallow a point exchangeable with at least a part of a product or a service to be issued to a user, the user designating a first environmental burden as the environmental burden of the hydrogen to be supplied to accept supply of the hydrogen, and
     allow the point to be issued, via the communication unit, to a user, the user designating a second environmental burden lower than the first environmental burden as the environmental burden of the hydrogen to be supplied to accept supply of the hydrogen, wherein the point management system comprises:
   a point memory that stores information on the point related to a user for which the point is issued;
   a point communication unit that receives, from the hydrogen gas supply system, the information on the point issued to the user; and
   a point management unit that adds, based on the information on the issued point, the issued point to points indicated by the point information related to the user in the point memory,
   wherein the point management unit outputs the point information related to the user in the point memory, via the point communication unit, in accordance with an external request.

2. The point management system according to claim 1, wherein the point management unit is further configured to externally receive point information on used points related to a user, via the point communication unit, and subtract the used points from points indicated by the point information related to the user in the point memory.

3. A service management system that manages provision of at least either of a service and a product, the service management system comprising:

a service management unit that calculates, in accordance with provision of at least either of a service and a product to a user, a point to be subtracted from points related to the user; and a service communication unit that sends information indicative of the used points to be subtracted related to the user to the point management system according to claim 2.

4. The point management system according to claim 1, wherein the point management unit further configured to calculate points issued to a user during a predetermined period, and store in the point memory the points related to the user, and output information on the points issued during the period to the user, the information being stored in the point memory related to the user, in accordance with an external request, via the point communication unit.

5. A service management system that manages provision of at least either of a service and a product, the service management system comprising:

a service communication unit configured to receive, from the point management system according to claim 4, information on points issued during the period to a user; and a service management unit that does not provide, to a user with a smaller number of points issued during the period to the user than a threshold, at least either of a service and a product determined beforehand, and provides, to a user with a greater number of points issued during the period to the user than the threshold, the at least either of the service and the product.

6. The point management system according to claim 1, wherein the burden information includes information at least separately indicative of hydrogen obtained by allowing fossil fuel and water to react with each other, and hydrogen obtained by allowing water to undergo electrolysis with electric power obtained by utilizing natural energy.

7. The point management system according to claim 1, wherein the controller includes a memory configured to store the burden information of the hydrogen related to information on an amount of the hydrogen, wherein the controller is configured to accept, from the user, via the user interface unit, before the hydrogen is supplied from the storing unit to the user, designation of the environmental burden with respect to the hydrogen to be supplied to the user, and wherein the controller is configured to update, based on the designated environmental burden and an amount of the hydrogen supplied from the storing unit to the user, the burden information linked to the information on the amount of the hydrogen and stored in the memory.

8. The point management system according to claim 7, wherein the controller is configured to send, to another hydrogen gas supply system via the communication unit, information including at least some of the burden information related to the information on the amount of the hydrogen in the memory, with information on an amount of hydrogen linked, and update the burden information related to the information on the amount of the hydrogen in the memory, based on the information including the at least some of the burden information sent to the other hydrogen gas supply system and the information on the amount of the hydrogen linked.

9. The point management system according to claim 8, wherein the controller is further configured to receive, from another hydrogen gas supply system via the communication unit, information including at least some of the burden information related to information on an amount of hydrogen, and update the burden information stored in the memory, based on the information including the at least some of the burden information and the information on the amount of the hydrogen received from the other hydrogen gas supply system.

10. The point management system according to claim 9, wherein the controller is further configured to disallow a point exchangeable with at least a part of a product or a service to be issued to a user, the user designating a first environmental burden as the environmental burden of the hydrogen to be supplied to accept supply of the hydrogen, and allow the point to be issued, via the communication unit, to a user, the user designating a second environmental burden lower than the first environmental burden as the environmental burden of the hydrogen to be supplied to accept supply of the hydrogen.

\* \* \* \* \*